United States Patent [19]

Higashijima

[11] Patent Number: 5,064,586

[45] Date of Patent: Nov. 12, 1991

[54] CERAMIC MATERIAL EXTRUDING METHOD AND APPARATUS THEREFOR

[75] Inventor: Kouzou Higashijima, Nagoya, Japan

[73] Assignee: NGK Insulators, Ltd., Tokyo, Japan

[21] Appl. No.: 499,689

[22] Filed: Mar. 27, 1990

[30] Foreign Application Priority Data

Mar. 27, 1989 [JP] Japan .................................... 1-71980

[51] Int. Cl.[5] ............................ B28B 3/24; B29B 7/72

[52] U.S. Cl. .................................... 264/40.6; 264/102; 264/177.11; 264/177.12; 264/211.11; 425/144; 425/197; 425/203; 425/204; 425/205; 425/382.3; 425/464

[58] Field of Search .................. 264/40.6, 102, 177.11, 264/177.12, 209.8, 211.11; 425/143, 144, 198, 205, 197, 199, 203, 204, 209, 202, 382.3, 461, 464

[56] References Cited

U.S. PATENT DOCUMENTS

| | | | |
|---|---|---|---|
| 3,919,384 | 11/1975 | Cantaloupe et al. | 264/177.11 |
| 4,551,295 | 11/1985 | Gardner et al. | 264/177.11 |
| 4,839,120 | 6/1989 | Baba et al. | 264/177.11 |

FOREIGN PATENT DOCUMENTS

| | | | |
|---|---|---|---|
| 80332 | 7/1894 | Fed. Rep. of Germany . | |
| 1899756 | 8/1964 | Fed. Rep. of Germany . | |
| 3805569 | 9/1988 | Fed. Rep. of Germany . | |
| 2361210 | 8/1977 | France . | |
| 56-159140 | 12/1981 | Japan | 425/144 |
| 62-259805 | 11/1987 | Japan . | |
| 1502134 | 2/1978 | United Kingdom . | |

OTHER PUBLICATIONS

Soviet Inventions Illustrated, week C49, 21st Jan. 1981, accession No. L7664/C49, Derwent Publications, Ltd., London, GB; & SU-A-729 061 (Milyak G. V.) 28-04-1980.

*Primary Examiner*—Jeffery Thurlow
*Assistant Examiner*—Mathieu Vargot
*Attorney, Agent, or Firm*—Parkhurst, Wendel & Rossi

[57] ABSTRACT

A method and an apparatus for extruding a ceramic batch supplied from a vacuum auger machine into a formed body by a plunger molding machine, wherein the temperature distribution of the ceramic batch at the outlet portion is measured and is controlled so as to supply the ceramic batch having substantially a uniform temperature to the plunger molding machine from the vacuum auger machine.

9 Claims, 4 Drawing Sheets

CERAMIC MATERIAL EXTRUDING METHOD AND APPARATUS THEREFOR

BACKGROUND OF THE INVENTION

1. Field of the Invention

The present invention relates to a method of extrusion forming ceramic material, particularly suitable for extrusion forming of honeycomb ceramic structural body and an apparatus for use in the method.

2. Related Art Statement

Hitherto there have been made use of a ceramic batch of powder ceramic low material mixed with forming aids consisting of binding agent such as methyl cellulose or the like, plasticizer and lubricants for forming a ceramic honeycomb structural body. In forming process of such a ceramic batch there is a correlation between the temperature and hardness of the ceramic batch. The correlation is effected by the kind or amount of methyl cellulose or a combination with other forming aids, but it is generally depicted as shown in FIG. 3.

In a case of extrusion forming by use of such a ceramic batch having aforementioned characteristics there are disadvantages that when the temperature of the ceramic batch increases higher than the gelling temperature thereof, the hardness of the ceramic batch abruptly increases and also when the distribution of hardness of the ceramic batch is not uniform, defects are intended to occur in the honeycomb structural body to be formed.

Thus, according to the prior art, a test piece of about 50 mm thickness is taken from a ceramic batch at the outlet of an auger machine (downstream to a forming column ring) and instantaneously a rod shaped thermometer is inserted into the test piece to measure the temperature of the ceramic batch and at the same time the hardness of the ceramic batch of the test piece is measured by means of a penetrator. Then, an operator controls flow rate of cooling water for cooling the auger machine by hand according to the results of measurements.

As an alternative for saving handling by operator, Japanese Patent Application Laid-open Publication No. 62-259805 discloses a method of controlling rotating speed of screw members of a pug portion and an auger portion of a vacuum pug mill according to a temperature difference between a temperature measured at an inlet portion of the pug portion and a temperature of a porous plate measured at an outlet of the pug portion.

However, in the method disclosed in the aforementioned Japanese Patent Application Laid-open Publication No. 62-259805, the temperature of the ceramic batch is presumed from the temperature of the porous plate arranged at the outlet of the pug portion and is not actually measured just before the ceramic batch is extruded from the pug portion. Consequently, the operation of the vacuum pug mill is not exactly and accurately controlled so that the kneaded ceramic batch is not satisfied for extruding by means of a plunger molding machine.

SUMMARY OF THE INVENTION

A principal object of the invention is to provide a ceramic material extruding method and an apparatus for carrying out the method, which eliminate the disadvantages in the prior art as mentioned above to prevent defects occurring in the ceramic structural body extruded by means of a plunger molding machine.

According to the first aspect of the present invention, there is a provision of a method of extruding a ceramic batch supplied from a vacuum auger machine into a formed body by a plunger molding machine comprising steps of measuring temperature of a cross section of the ceramic batch just before extrusion, and controlling a cooling temperature of the vacuum auger machine in accordance with the measured temperature.

According to the second aspect of the present invention, an apparatus for extruding a ceramic batch comprising a vacuum auger machine including a vacuum kneading section for kneading a ceramic material to produce a ceramic batch, and a batch transfer section having an auger for transferring said ceramic batch to a columnar body forming section adapted for forming the kneaded ceramic material into a columnar body, further comprises a temperature measuring drum including one or more temperature measuring bars positioned at the outlet side of the batch transfer section upstream to the columnar body forming section for measuring temperature distribution in a cross section of the ceramic batch.

With the above arrangement, the inventors have found that the difference between temperatures in the inner and outer portions of the ceramic batch extruded from the vacuum auger machine is mainly caused of heat developed by contacting between the auger screw and the ceramic batch and therefore if the temperature of the ceramic batch in a region of the auger screw is effectively, controlled, the ceramic batch having excellent properties is obtainable. Thus, according to the present invention, the temperature of the ceramic batch in the cross section thereof is measured just before extrusion of the ceramic batch from the vacuum auger machine and the cooling of the vacuum auger machine, particularly in a region of the auger screw is controlled.

Practically, a temperature measuring drum including temperature measuring bars for measuring a distribution of temperature in a cross section of the ceramic batch is arranged at the outlet side of the batch transfer section upstream to the columnar body forming section to measure the distribution of temperature in the cross section of the ceramic batch by means of a temperature measuring bar. Moreover, the vacuum auger machine is cooled by controlling in accordance with the result of the temperature measurement so as to make the distribution of temperature in the ceramic batch uniform.

DESCRIPTION OF THE PREFERRED EMBODIMENTS

Figure 1:
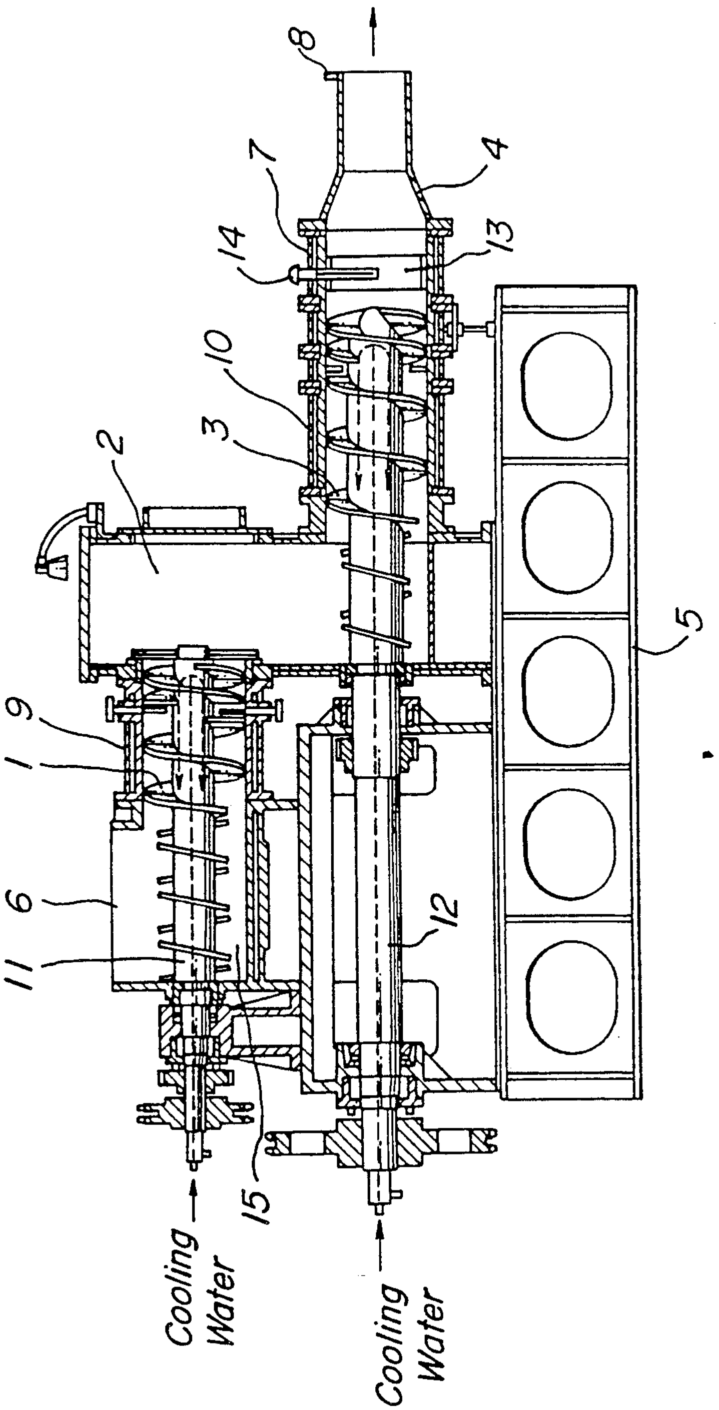
FIG. 1 is a partial sectional view illustrating one embodiment of an apparatus for use in carrying out the ceramic material extruding method according to the invention.

FIG. 1 is a partial sectional view of one embodiment of an apparatus for use in the ceramic extruding method according to the invention. The apparatus shown in FIG. 1 comprises a vacuum kneading section including a screw type mill 1 and a vacuum chamber 2 for kneading a ceramic material to obtain a ceramic batch for forming a ceramic body, and a columnar body forming section including a batch transfer section having an auger 3 for transferring the ceramic batch in the vacuum chamber 2 and a forming column ring 4 for forming the ceramic batch transferred by the auger 3 into a circular or columnar body. The vacuum kneading section and the columnar body forming section are mounted on a frame 5.

The screw type mill 1 serves to transfer the ceramic material supplied through a material supply inlet 6 into the vacuum chamber 2 while the material is being kneaded. Air bubbles in the ceramic batch are removed in the vacuum chamber 2. The ceramic batch falls in the vacuum chamber by gravity so as to be loosened and transferred into the batch transfer section. Moreover, the screw type mill 1 comprises a primary drum 9 having a double outer wall through which cooling water is passed, and a hollow screw shaft 11 through which cooling water also is passed as shown by a broken line. With such an arrangement, the temperature of the ceramic batch can be initially controlled.

The ceramic batch supplied to the batch transfer section is transferred by the auger 3, while being compressed. Then, the batch passes through a temperature measuring drum 7 provided at the outlet side of the transfer section so as to be measured its temperature and be finally loosened and crushed. Thereafter, the ceramic batch is formed into a formed circular cylindrical or columnar body in the forming column ring 4. Moreover, the auger 3 is surrounded by a secondary drum 10 of a double wall through which cooling water is passed and also has a hollow screw shaft 12 through which cooling water is passed as shown by a broken line, thereby cooling the outer and inner portions of the ceramic batch in a controlled manner.

Figure 2:
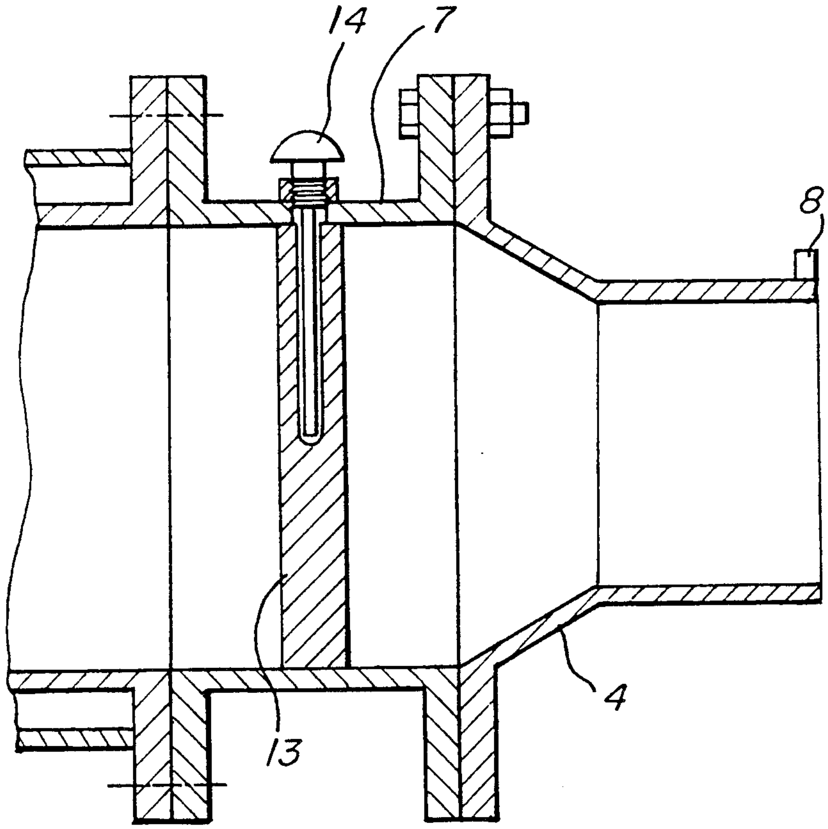
FIG. 2 is an enlarged sectional view of the outlet portion of the apparatus shown in FIG. 1.

The temperature measuring drum 7 as shown in enlarged section of FIG. 2 is provided with a plurality of temperature sensors 14 such as a thermocouple. Each temperature sensor is embedded in temperature measuring rod 13 extended across the cross section of the measuring drum so as to continuously measure the temperature of the ceramic batch passing the surface of the temperature measuring rod 13. The results measured by the sensors are continuously monitored by means of a display and a recorder (not shown) and also used to control the temperature of the ceramic batch.

The columnar body formed in the forming column ring 4 is cut in a predetermined length by means of a cutter 8 provided at the outlet of the forming column ring 4. The cut columnar body is supplied to a plunger molding machine (not shown) for a next process. In this case, it is required for the columnar body to have a diameter and a length enabling it to be inserted into a cylinder of the plunger molding machine. Any plunger molding machines publicly known may be used for this purpose.

Figure 3:
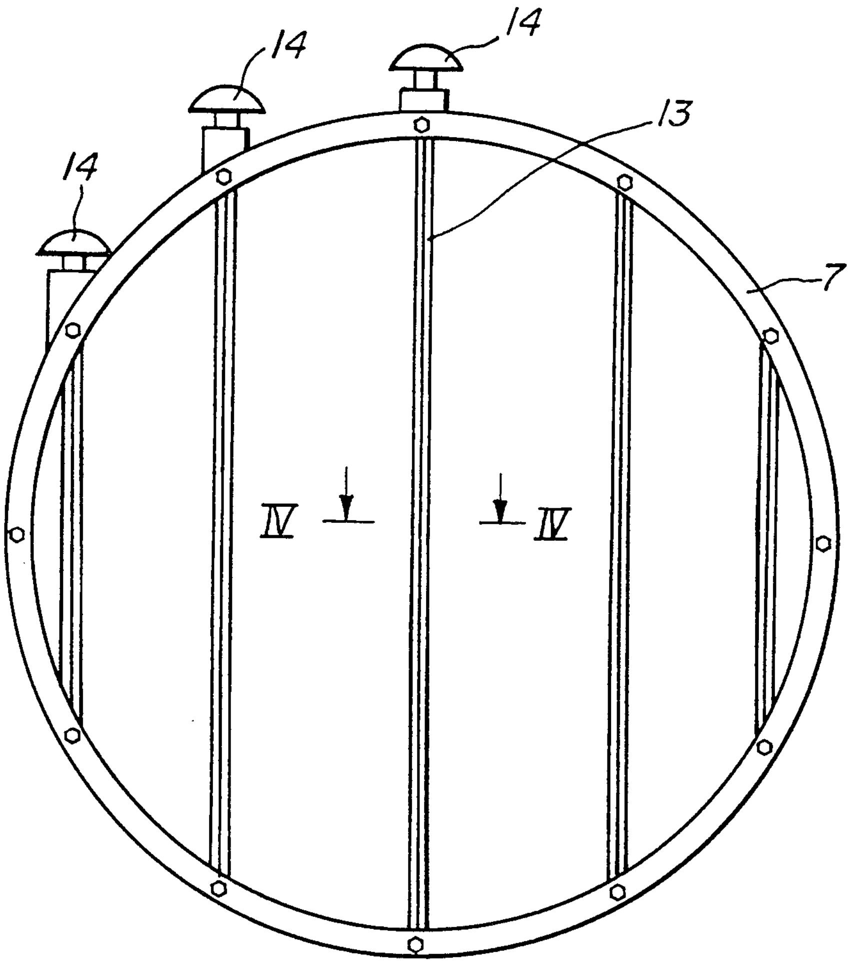
FIG. 3 is an elevational view of the temperature measuring drum shown in FIG. 2.
Figure 4:
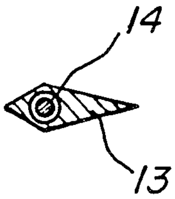
FIG. 4 is a sectional view taken along the line IV—IV in FIG. 3.
Figure 5:
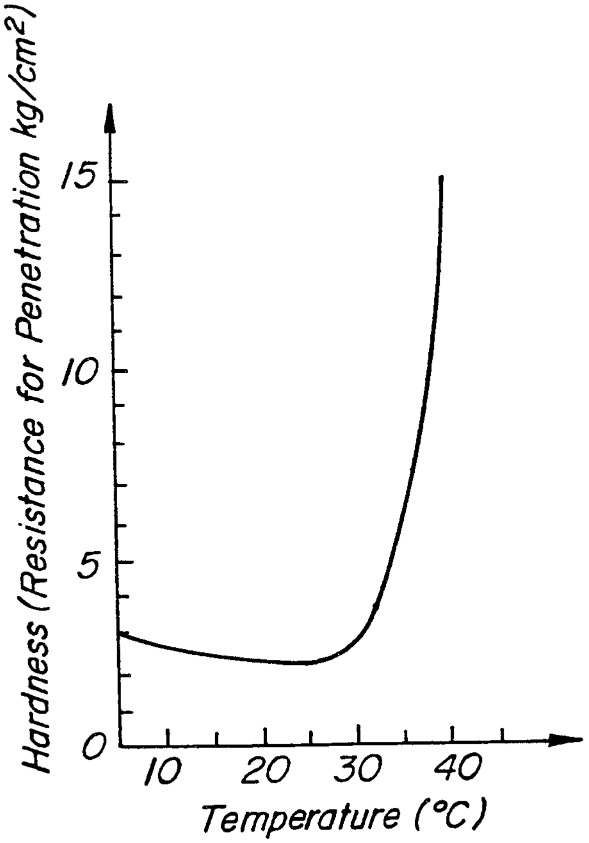
FIG. 5 is a graph showing a relationship between temperature and hardness of the ceramic batch.

FIGS. 3 and 4 are plane and sectional views illustrating an example of temperature measuring drum 7 to be used in the apparatus according to the invention. In the example, the temperature measuring bar 13 is in the form of the teeth of a comb. A section of the bar 13 is streamlined from the side of the auger to the outlet side of the vacuum auger machine. According to such an arrangement of the temperature measuring bars, the temperature distribution in the inner and outer portions as well as the intermediate portion between the inner and outer portions of the ceramic batch passing through the temperature measuring drum can be measured. Moreover, the temperature measuring bars 13 greatly effect the removal of laminations in the ceramic batch. As the section of the bar 13 is streamlined, resistance of the batch passing through the drum is much reduced. In order to improve the responsibility of the temperature sensor 14 embedded in the bar 13, the sensing portion of the temperature sensor 14 preferably contacts with the inner wall of the bar 13 in all time. The temperature measuring bar 13 is preferably made of material having a high heat conductivity such as copper, but a carbon steel can be practically used.

In carrying out the ceramic extruding method by use of the apparatus as mentioned above, a prepared ceramic material is first supplied into the material supply inlet 6. Thus supplied ceramic material is kneaded in the vacuum kneading section consisting of the screw type mill 1 and the vacuum chamber 2. Thereafter, the kneaded ceramic material is transferred by the auger 3 into the temperature measuring drum 7 in which the temperature distribution in the ceramic batch is measured and the ceramic batch is loosened.

The measured temperature distribution of the ceramic batch is fed back to individually control the flow rate of cooling water in each of sections. Thus, the temperature of the ceramic batch is accurately and quickly controlled. For example, when the temperature in the central portion of the ceramic batch passing through the temperature measuring drum 7 is high, the flow rate of cooling water passing through the hollow screw shaft 12 of the auger 3 should be increased, on the contrary when the temperature in the peripheral portion of the ceramic body is high, the flow rate of the cooling water passing through the double wall of the secondary drum 10 should be increased. Moreover, the temperature of the ceramic batch may be initially controlled as the whole by adjusting the flow rate of cooling water passing through the double wall of the primary drum 9, the hollow screw shaft 11 of the screw type mill 1 and the double wall of the barrel 15.

Then the loosened and crushed ceramic material is formed by the forming column ring 4 and the cutter 8 into a formed columnar body having the diameter and the length enabling it to be inserted into the cylinder of the plunger molding machine. Finally, the formed columnar body is extruded by the conventional plunger molding machine to form a formed body having a predetermined shape.

It should be noted that the present invention is not limited to the aforementioned embodiment and other changes and modifications can be made without departing from the spirit and scope of the invention. For example, the number of temperature measuring bars with the temperature sensors such as thermocouples embedded therein can be increased more than three in the embodiment shown in FIG. 3 in order to be effected more accurate temperature measurement. In the other way, the arrangement of the temperature measuring bars can be simplified by embedding the temperature sensors into only the two temperature measuring bars at the central and outer side in the temperature measuring drum in order to measure the temperature at only the central and peripheral portions of the ceramic batch.

As can be seen from the above, according to the ceramic material extruding method and apparatus of the present invention a ceramic batch kneaded and supplied for forming a ceramic body is passed through the temperature measuring grid drum to measure the temperature at least at the central and peripheral portions in the cross section of the ceramic batch and thus measured temperature distribution is used to control the temperature of the ceramic batch. Consequently, the temperature of the ceramic batch can be quickly and accurately controlled to obtain the ceramic batch having substantially uniform temperature distribution. Therefore, it is possible to produce a high accurate ceramic honeycomb structural body without cracks, deformation and other defects in the next process for extrusion forming the honeycomb structural body in the plunger molding machine and to improve the producibility and yield of the honeycomb structural body.

What is claimed is:

1. A method of extruding a formed body in which temperatures of a batch material are regulated, comprising the steps of:

feeding the material into a kneading section having a first auger disposed therein, the material being kneaded and transferred to a vacuum chamber via said first auger;

transferring the material from the vacuum chamber through a batch transfer section and through a temperature measuring drum positioned at a downstream end of a said batch transfer section via a second auger disposed in said batch transfer section, said temperature measuring drum having rods extending entirely across at least central and outer-peripheral portions of a cross-section thereof, said rods each having a streamlined cross-sectional shape and temperature sensors embedded therein;

measuring temperatures at least at central and outer-peripheral portions of the material via said temperature sensors;

controlling temperatures of at least one of said kneading section, said batch transfer section, said first auger and said second auger based upon the temperatures measured by said sensors, for regulating temperatures of the material; and forming the material into a columnar body.

2. The method of claim 1, wherein the batch material is ceramic and said formed body has a honeycomb shape.

3. The method of claim 1, wherein said rods are further disposed at intermediate portions between the central portions and the outer-peripheral portions of the cross-section of the temperature measuring drum, the temperatures being measured at the central portions, the intermediate portions and the outer-peripheral portions.

4. The method of claim 1, wherein said first auger and said second auger are hollow for circulating cooling water therein, the central portion of the material being cooled by increasing a flow rate of the cooling water through at least one of said first auger and said second auger.

5. The method of claim 1, wherein said kneading section and said batch transfer section each have an outer double wall structure for circulating cooling water therein, the outer-peripheral portion of the material being cooled by increasing a flow rate of the cooling water through at least one of said kneading section and said batch transfer section.

6. An apparatus for extruding a formed body in which temperatures of a batch material are regulated, comprising:

a kneading section into which the material is fed, said kneading section having a first auger disposed therein;

a vacuum chamber disposed adjacent said kneading section, the material being kneaded and transferred to said vacuum chamber via said first auger;

a batch transfer section disposed adjacent said vacuum chamber, said batch transfer section having a second auger disposed therein;

a temperature measuring drum disposed at a downstream end of said second auger, said temperature measuring drum having rods extending entirely across at least central and outer-peripheral portions of a cross-section thereof, said rods each having a streamlined cross-sectional shape and temperature sensors embedded therein; and a body forming section disposed downstream of said temperature measuring drum for forming a columnar body, the material being transferred from said batch transfer section to said body forming section via said second auger;

wherein temperatures at least at central and outer-peripheral portions of the material are measured by said temperature sensors and temperatures of at least one of said kneading section, said batch transfer section, said first auger and said second auger are controlled based upon the measured temperatures, for regulating temperatures of the material.

7. The apparatus of claim 6, wherein said rods are spaced apart in parallel and extend across the cross-section of the temperature measuring drum.

8. The apparatus of claim 6, wherein said first auger includes a hollow screw shaft and said kneading section includes an outer double wall surrounding said first auger each for circulating cooling water therethrough.

9. The apparatus of claim 6, wherein said second auger includes a hollow screw shaft and said batch transfer section includes an outer double wall surrounding said second auger each for circulating cooling water therethrough.

* * * * *